United States Patent [19]

Reeble

[11] Patent Number: 5,076,025

[45] Date of Patent: Dec. 31, 1991

[54] LAND GRINDER MOUNT

[75] Inventor: William J. Reeble, Tulsa, Okla.

[73] Assignee: Mathey International, Ltd., Tulsa, Okla.

[21] Appl. No.: 622,555

[22] Filed: Dec. 5, 1990

[51] Int. Cl.$^5$ .............................................. B24B 19/00
[52] U.S. Cl. ................................ 51/241 S; 51/241 B; 269/48.1
[58] Field of Search ............... 51/241 S, 241 B, 241 R, 51/170 R, 170 PT; 81/156, 159, 160; 294/97; 269/48.1, 48.3, 173

[56] References Cited

U.S. PATENT DOCUMENTS

| | | | |
|---|---|---|---|
| 1,823,959 | 8/1929 | Steinmayer | 51/241 B |
| 2,414,731 | 1/1947 | Forbes, Jr. | 51/241 S |
| 2,501,893 | 3/1950 | Dudley | 269/48.1 X |
| 2,587,398 | 2/1952 | Smith | 51/241 S X |
| 2,615,413 | 10/1952 | Adams et al. | 269/48.1 X |
| 2,931,146 | 4/1960 | Handwerk et al. | 51/241 R |
| 3,030,903 | 4/1962 | Morris | 269/48.1 |
| 3,067,651 | 12/1962 | Hogden et al. | 51/241 B X |
| 3,330,021 | 7/1967 | Jacobsen | 269/48.1 X |
| 3,601,387 | 8/1971 | Pavlich | 269/48.1 |
| 4,304,398 | 12/1981 | Crowell | 269/48.1 |
| 4,934,109 | 6/1990 | Allred | 51/241 S |

FOREIGN PATENT DOCUMENTS 7805515 11/1979 Netherlands .

*Primary Examiner*—M. Rachuba
*Assistant Examiner*—John A. Marlott
*Attorney, Agent, or Firm*—Head & Johnson

[57] ABSTRACT

In accordance with the invention a mount is provided for positioning a grinder on a pipe of any diameter selected from a given range of pipe diameters. The mount has a threaded plunger with a joint fixed at its lower end and a housing slidably reciprocable on the plunger above the fixed joint. Centering members are angularly displaced around the lower portion of the plunger with exterior surfaces parallel to and equidistant from the longitudinal axis of the plunger. Each of the centering members is connected by a scissor to the fixed joint and to the slidable housing so that as the plunger is moved upwardly or downwardly on the housing the members are extended or retracted in parallel or equidistant relationship to the plunger. A swivel housing mounted on the reciprocable housing rotates about the plunger and the grinder is connected for rotation with the swivel housing. The reciprocable housing contains a mechanism which, in a first mode of operation, permits the plunger to be pushed or pulled within the reciprocable housing so that the centering members may be rapidly retracted or extended and, in a second mode of operation, threadedly engages the plunger to permit the plunger to be rotated within the reciprocable housing to slowly retract or extend the centering members. In one preferred embodiment, the mount includes a spring tension assembly which permits adjustment of the pressure of the grinding surface against the pipe end.

12 Claims, 3 Drawing Sheets

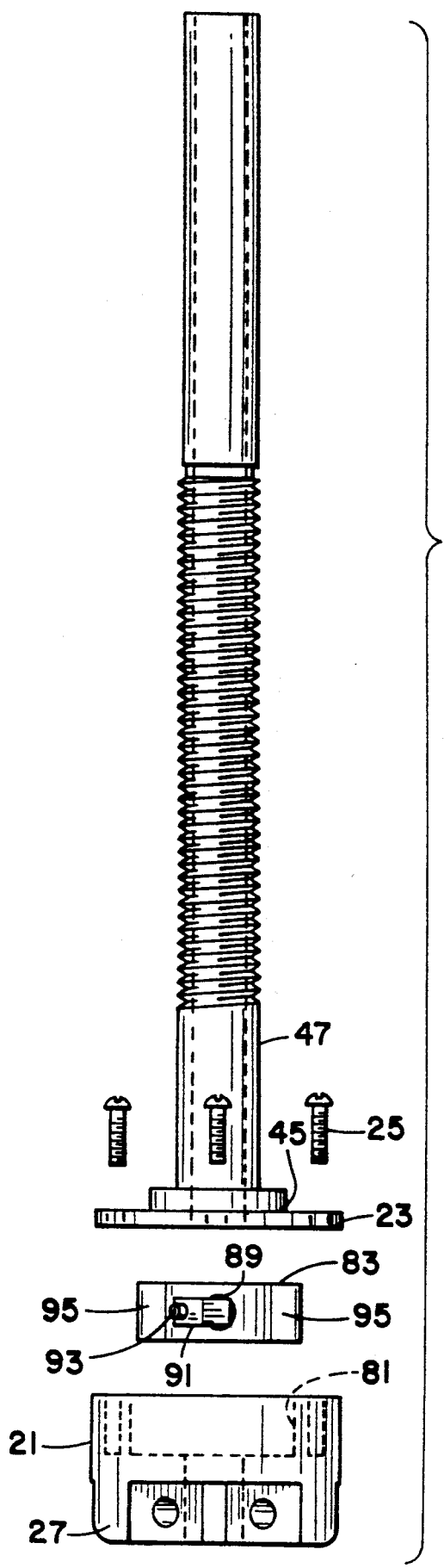
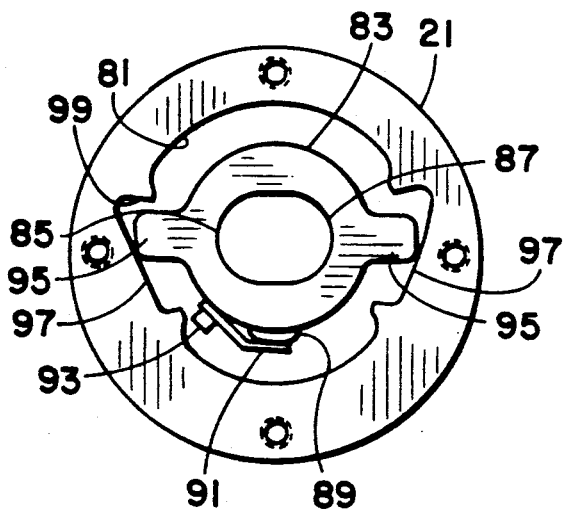
Fig. 2
Fig. 3

LAND GRINDER MOUNT

BACKGROUND OF THE INVENTION

This invention relates generally to pipe fabricating equipment and more particularly concerns equipment used to grind lands on beveled pipe ends and to reface beveled surfaces.

In order to provide smooth and precise lands and beveled surfaces for the end-to-end connection, principally by welding, of sections of pipe, it is necessary to accurately align the center of rotation of the grinder on the longitudinal axis of the pipe. Various types of mounts have been developed in the past for this purpose. The wide range of pipe diameters to which the mount may be applied, the variations in bevel requirements and the mounting characteristics of the grinders themselves have resulted in the development of mounts that are difficult to center, time consuming to set up and take down, difficult to handle and easily damaged.

It is therefore among the objects of the present invention to provide a mount for grinders that is fully automatic in centering on the longitudinal axis of a pipe, easily mounted in and removed from the pipe, precise in positioning for rotation of a grinder about the pipe, easily adjustable for smooth motion along its travel path, lightweight and portable and easily repairable.

SUMMARY OF THE INVENTION

In accordance with the invention a mount is provided for positioning a grinder on the end of a pipe of any diameter selected from a given range of pipe diameters. The mount has a threaded plunger with a joint fixed at its lower end and a housing slidably reciprocable on the plunger above the fixed joint. Centering members are angularly displaced around the lower portion of the plunger with exterior surfaces parallel to and equidistant from the longitudinal axis of the plunger. Each of the centering members is connected by a scissor to the fixed joint and to the slidable housing so that as the plunger is moved upwardly or downwardly in the housing the members are extended or retracted in parallel or equidistant relationship to the plunger. A swivel housing mounted on the reciprocable housing rotates about the plunger and the grinder is attached for rotation with the swivel housing. The reciprocable housing contains a mechanism which, in a first mode of operation, permits the plunger to be pushed or pulled within the reciprocable housing so that the centering members may be rapidly retracted or extended and, in a second mode of operation, threadedly engages the plunger to permit the plunger to be rotated within the reciprocable housing to slowly retract or extend the centering members. In one preferred embodiment, the mount includes a spring tension assembly which permits adjustment of the pressure of the grinding surface against the pipe end.

BRIEF DESCRIPTION OF THE DRAWINGS

Other objects and advantages of the invention will become apparent upon reading the following detailed description and upon reference to the drawings in which:

FIG. 2 is a developmental front elevation view of several components of the preferred embodiment of FIG. 1;

FIG. 3 is a cross-sectional view taken along line A—A of FIG. 2;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
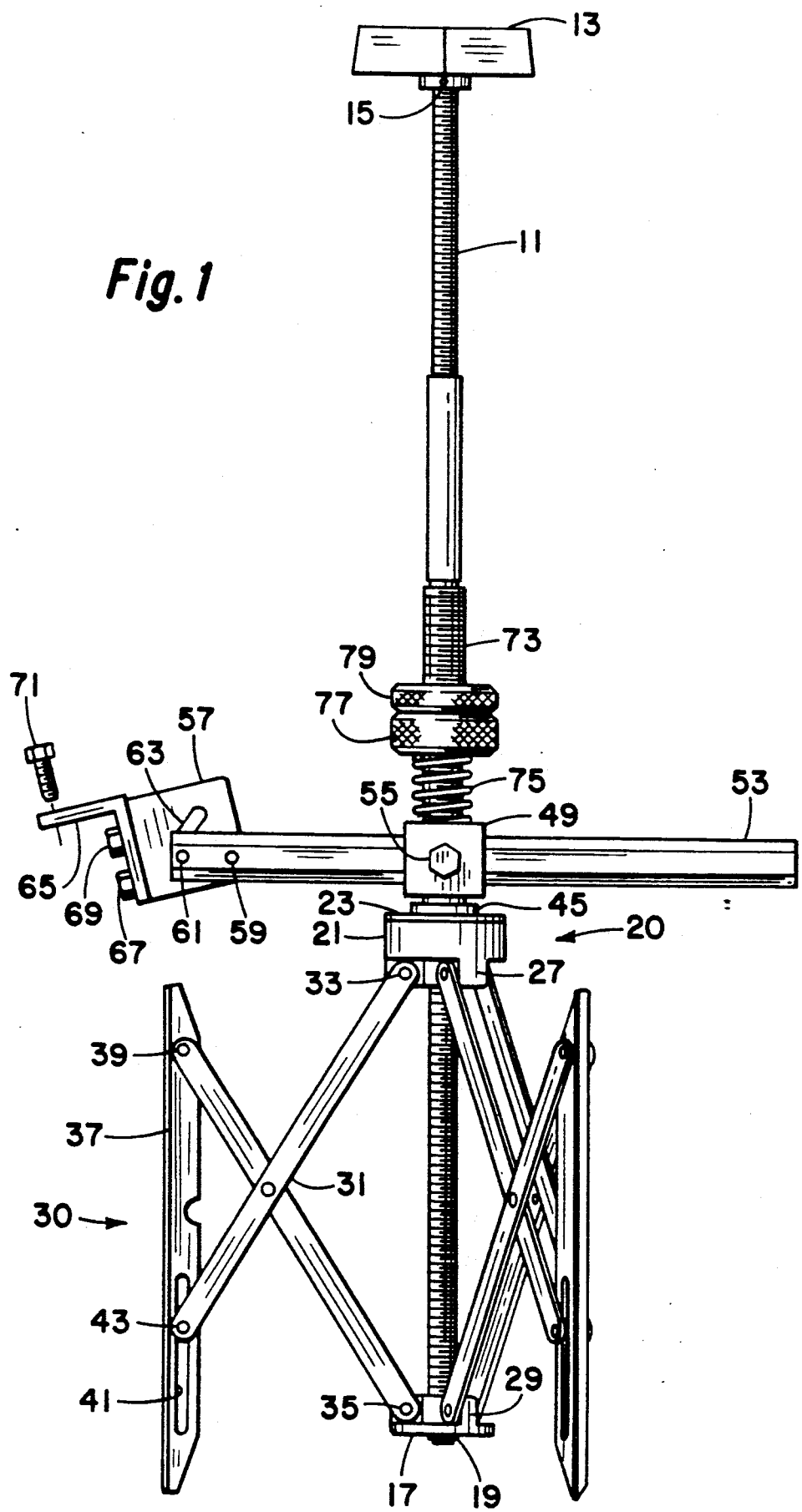
FIG. 1 is a front elevation of a preferred embodiment of the mount in a partially extended condition.

Turning first to FIG. 1, a preferred embodiment of the grinder mount is illustrated. A threaded plunger 11 has a handle 13 threaded on its upper end and locked in position by a pin 15. A fixed joint 17 is secured to the lower end of the plunger 11 by a retaining ring 19. A reciprocable housing 20 is slidably mounted on the plunger 11. As can best be seen in FIGS. 2, 3 and 4, the reciprocable housing 20 consists of a body 21 and a cover 23 which is secured to the body 21 by screws 25. The lower part of the body 21 is provided with several lugs 27. In the preferred embodiment there are three lugs 27 angularly displaced at 120° about the plunger 11. Similar lugs 29 are provided on the upper portion of the fixed joint 17. The lugs 27 and 29 on the body 21 and the fixed joint 17 are used to connect several extendable and retractable centering mechanisms 30. The centering mechanisms 30 each consist of a pair of scissors 31 journalled to the body 21 by a pin 33 and to the fixed joint 17 by a pin 35. Each centering mechanism 30 has a centering member 37 which is held by its scissors 31 in parallel and equidistant relationship to the longitudinal axis of the plunger 11. The upper end of the centering member 37 is journalled to the scissor 31 by a pin 39. The lower end of the centering member 37 has an extended slot 41 parallel to the longitudinal axis of the plunger 11. The lower end of the scissor 31 is slidably mounted in the slot 41 by a pin 43. Thus, as the plunger 11 moves upwardly or downwardly through the reciprocable housing 20, the scissors 31 will be caused to open or close, thereby retracting or extending the centering members 37 in relation to the longitudinal axis of the plunger 11.

The cover 23 is provided with a collar 45 which surrounds the plunger 11 and a sleeve 47 extends upwardly from the collar around the plunger 11. A swivel housing 49 is mounted for rotation about the sleeve 47 and rests on the collar 45. The swivel housing 49 extends radially outwardly from the sleeve 47 and has a horizontal bore or aperture (not shown) in which is mounted a rod, bar or the like 53 which may be extended at varying lengths through the swivel housing 49. A lock bolt 55 is provided through the swivel housing 49 so that the rod 53 can be secured at its desired extension length through the swivel housing 49. One end of the rod 53 is fitted with a mounting bracket 57. The mounting bracket 57 is secured to the rod 53 by a first bolt 59 which extends through a hole in the mounting bracket 57 and by a second bolt 61 which extends through an arcuate slot 63 in the mounting bracket 57. Thus, the angular relation of the mounting bracket 57 to the rod 53 may be varied. The mounting bracket 57 is L-shaped and an adjusting bracket 65 is connected to it by use of a first bolt 67 extending through a hole in the mounting bracket 57 and by a second bolt 69 extending through an arcuate slot in the upper portion of the mounting bracket similar to the arrangement previously described. Thus, the position of the adjustable bracket 65 can be rotated in relation to the mounting bracket 57. The grinder (not shown) is attached to the adjustable bracket 65, for example, by use of attachment bolt 71. Thus, by adjustment of the extension of the rod 53 and the angular relationships of the mounting bracket 57 and the adjustable bracket 65, the grinder can be appropriately located in position over the end of pipes having a variety of diameters and bevel angles.

In the preferred embodiment shown, provision is also made for the adjustment of the pressure of the grinder against the pipe end or beveled surface. The sleeve 47 about which the swivel housing 49 rotates is provided with an external thread 73 above the swivel housing 49. A coil spring 75 is mounted on the sleeve 47 and rests on the swivel housing 49. A tension nut 77 rotated on the threads 73 allows the spring 75 to be compressed to a desired tension level between the swivel housing 49 and the tension nut 77. A locking nut 79 also rotatable on the threads 73 may be used to secure the tension nut 77 against inadvertent upward rotation. Thus, the pressure of the grinder against the end or beveled surface of the pipe can be adjusted by varying the compression of the spring 75 by rotation of the tension nut 77.

The reciprocable housing 20 contains a dual mode mechanism for facilitating the rapid operation of the grinder mount. The body 21 of the housing 20 includes a topwardly accessible cavity 81. The cavity 81 contains an oblate nut 83 threaded on one side 85 to complement the threaded plunger 11 and smooth on the other side 87. A smooth pin 89 extends through a flattened pole of the oblate nut 83 and penetrates into the opening of the nut 83 under the resilient urging of a leaf spring 91 secured to the oblate nut 83 by a screw 93. The oblate nut 83 is also provided with exterior lugs 95 which ride against cam surfaces 97 which are tapered outwardly from the lugs 95 as they extend from one flattened pole of the oblate nut 83 to the other. Thus, in particular reference to FIG. 3, rotation of the oblate nut 83 in one direction will cause the nut to slide to one side of the reciprocable housing 20 while rotation of the nut in the opposite direction will cause the oblate nut 83 to slide toward the opposite side of the reciprocable housing 20. The cavity 81 is also provided with detents 99 which limit the shift of the oblate nut 83 to facilitate its threaded engagement or release of the plunger 11. As a result, when push or pull forces are exerted on the plunger 11, the leaf spring 91 releases the pressure of the pin 89 against the threads of the plunger 11, thus allowing the plunger 11 to be freely pulled or pushed through the oblate nut 83 and therefore through the reciprocable housing 20. In this mode of operation for the oblate nut 83, the centering members 37 of the grinder mount may be rapidly extended or retracted by the pulling or pushing motion. However, upon exertion of a rotational force on the plunger 11, the force of the leaf spring 91 maintains the pin 89 in engagement with the threads of the plunger 11 and causes the nut 83 to slide until its threaded portion 85 fully engages the threads of the plunger 11. In this mode, the continued rotation of the plunger 11 results in its slower threaded movement through the oblate nut 83 and the reciprocable housing 20.

Figure 4:
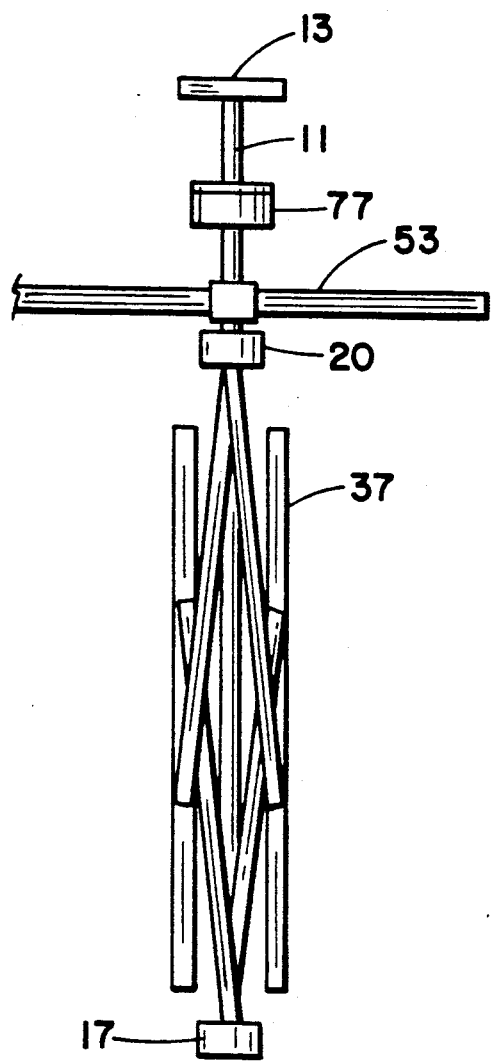
FIG. 4 is an elevational view illustrating the mount of FIG. 1 in a fully retracted condition.
Figure 5:
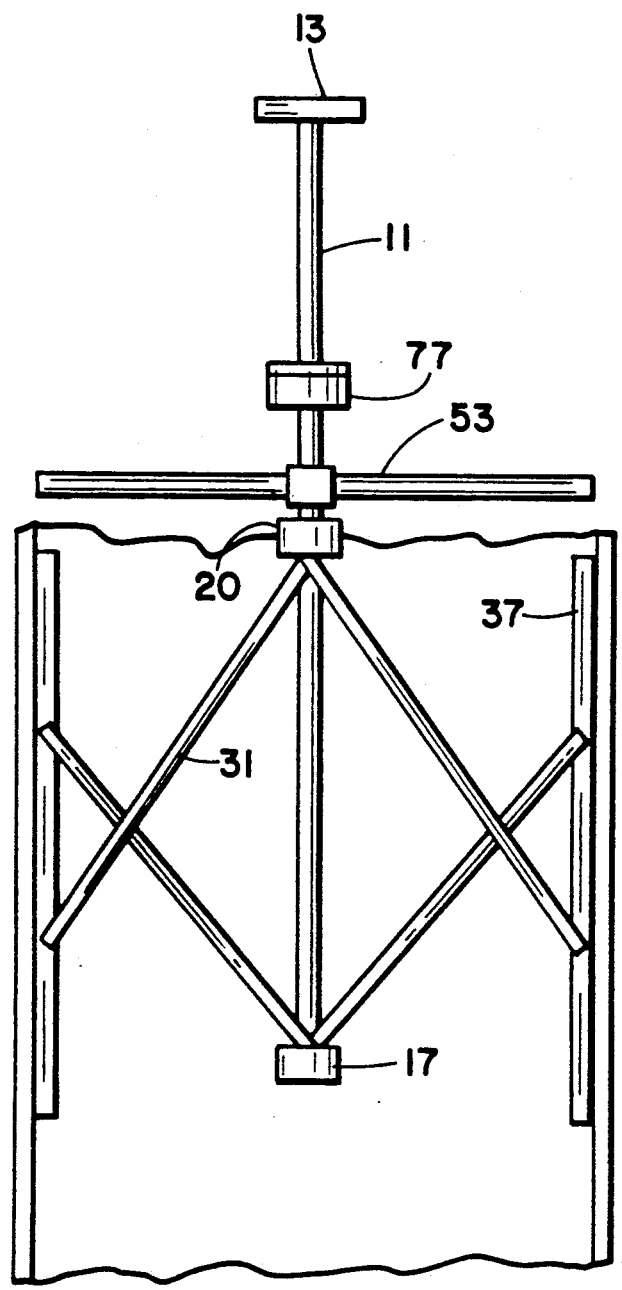
FIG. 5 is an elevational view illustrating the mount of FIG. 3 in an expanded condition in a pipe.

In operation, the plunger 11 is first pushed into the reciprocable housing 20 to bring the centering members 37 into a retracted position, as shown in FIG. 4. The centering members 37 are then inserted into the end of the pipe to be ground. With the members 37 thus inserted, the plunger 11 is pulled to withdraw it from the reciprocable housing 20. As the plunger 11 is withdrawn, the centering members 37 are extended into contact with the inner diameter of the pipe, thus causing the longitudinal axis of the plunger 11 to come into substantial alignment with the longitudinal axis of the pipe. Once the centering members 37 are in this abutting condition, the plunger 11 is rotated to shift the oblate nut 83 into its second mode of operation so that the plunger 11 will be threadedly upwardly driven in relation to the reciprocable housing so that the centering members 37 will be further extended into secure relationship against the interior surface of the pipe, as shown in FIG. 5. .In this secure position, the longitudinal axis of the plunger most accurately coincides with the longitudinal axis of the pipe. The locking bolt 55 of the swivel housing 49 is released so that the rod 53 can be extended to an appropriate length from the swivel housing 49 so that the grinder is in alignment with the edge of the pipe to be ground. In this condition, the locking nut 55 is retightened to secure the rod 53 in position. The mounting bracket 57 and the adjusting bracket 65 are then angularly adjusted by use of the bolts 61 and 69 to position the grinder at the appropriate angle for the refacing or land grinding work to be done. If the grinder mount has not been appropriately placed in depth relation into the pipe to correctly position the grinder, the plunger 11 is slightly rotated for downward motion into the reciprocable housing 20 to retract the centering members 37. The depth of the centering members 37 in the pipe is then adjusted and the plunger 11 slightly rotated for upward motion to restore the grinder mount in its firm position within the pipe. The tension nut 77 and locking nut 79 are then adjusted to achieve the desired amount of pressure of the grinder against the end of the pipe to be ground.

In its preferred embodiment, the grinder mount is retractable and extendable to permit installation in pipes in the range of from three to twelve inches inner diameter, though different ranges of diameters could be selected. Using appropriate steel and aluminum components, the overall grinder mount weighs less than ten pounds and is every easy to handle.

Thus, it is apparent that there has been provided, in accordance with the invention, a grinder mount that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. Apparatus for mounting a grinder on any diameter pipe selected from a given range of pipe diameters for rotation of the grinder about the longitudinal axis of the pipe to grind a land or reface a beveled end of the pipe comprising:

a threaded plunger;

a joint fixed at a lower end of said plunger;

a reciprocable housing slidably mounted on said plunger above said fixed joint;

a plurality of centering members angularly displaced and parallelly disposed at equal distances in relation to a longitudinal axis of said plunger;

a plurality of scissor means, one connecting each of said centering members to said fixed joint and to said slidable housing, for extending and retracting said centering members in parallel and equidistant relationship to said plunger in response to upward and downward motion of said plunger in said housing, respectively;

a swivel housing mounted on said reciprocable housing for rotational motion about said plunger;

means for connecting said grinder to said swivel housing for rotation therewith about said longitudinal axis of said plunger; and means disposed within said reciprocable housing for permitting said plunger in a first mode of operation to be selectively longitudinally pushed or pulled within said reciprocable housing to rapidly retract or extend said centering members, respectively, and in a second mode of operation to be selectively threadedly rotated downwardly or upwardly within said reciprocable housing to slowly retract or extend said centering members, respectively, whereby, when said centering members are extended into abutment with an inner surface of a pipe, said longitudinal axis of said plunger coincides with said longitudinal axis of said pipe.

2. Apparatus according to claim 1, said reciprocable housing comprising a body and a detachable cover plate defining a cavity therebetween.

3. Apparatus according to claim 2, said permitting means comprising an oblate nut interiorly threaded on one side and mounted in said cavity on said threaded plunger, means for biasing said nut into central sliding alignment within said plunger and means for shifting said nut into threaded engagement with said plunger when said plunger is rotated.

4. Apparatus according to claim 3, said biasing means comprising a pin extending radially through said nut into abutment with said plunger and spring means resiliently urging said pin toward said plunger.

5. Apparatus according to claim 4, said shifting means comprising exterior radial lugs on said nut and said cavity defining cam surfaces cooperable with said lugs to urge said nut off-center on said plunger during rotation of said plunger and detents cooperable with said lugs to restrict rotation of said nut during rotation of said plunger.

6. Apparatus according to claim 5 further comprising means for resiliently biasing said swivel housing downwardly on said plunger.

7. Apparatus according to claim 6 further comprising means for selectively varying the pressure exerted on said swivel housing by said biasing means.

8. Apparatus according to claim 7, said cover having an upwardly extending sleeve about said plunger, said swivel housing being slidably and rotatably mounted on said sleeve and said swivel housing biasing means comprising a coil spring exerting downward pressure against said swivel housing.

9. Apparatus according to claim 8, said sleeve having an externally threaded upper portion and said varying means comprising a tension nut rotatable on said threaded portion of said sleeve to adjust the compression of said coil spring.

10. Apparatus according to claim 9 further comprising a jam nut rotatable on said threaded portion of said sleeve above said tension nut to restrict upward movement of said tension nut.

11. Apparatus according to claim 10 further comprising handle means fixed to an upper end of said plunger for facilitating exertion of longitudinal and rotational forces on said plunger.

12. Apparatus according to claim 1 having three centering members and scissor means displaced at 120° angles.

* * * * *